United States Patent [19]

Katakura et al.

[11] 4,298,278

[45] Nov. 3, 1981

[54] DEVICE FOR DETACHABLY ATTACHING A MASTER SHEET TO A DRUM

[75] Inventors: Hiroshi Katakura, Fuchu; Takashi Tamura, Higashimine, both of Japan

[73] Assignee: Konishiroku Photo Industry Co., Ltd., Tokyo, Japan

[21] Appl. No.: 123,837

[22] Filed: Feb. 22, 1980

[30] Foreign Application Priority Data

Feb. 25, 1979 [JP] Japan .................................. 54-21251

[51] Int. Cl.³ .............................................. G03B 27/04

[52] U.S. Cl. .................................. 355/85; 355/3 DR; 355/104

[58] Field of Search ........................ 355/3 DR, 47-49, 355/85-87, 104-111; 354/15, 18, 19; 358/291

[56] References Cited

U.S. PATENT DOCUMENTS

| | | | |
|---|---|---|---|
| 771,775 | 10/1904 | Fullman | 355/105 |
| 3,531,200 | 9/1970 | Moll | 355/104 X |
| 3,610,121 | 10/1971 | Hansen et al. | 354/15 |
| 3,921,182 | 11/1975 | Hansen et al. | 354/15 |
| 4,089,009 | 5/1978 | Frazier | 354/15 |

*Primary Examiner*—Richard A. Wintercorn
*Attorney, Agent, or Firm*—James E. Nilles

[57] ABSTRACT

In a copying machine having a drum of the type in which a master sheet is detachably attached to the periphery of the drum, the improvement comprising a rotary shaft for supporting the drum, clutch means provided between the drum and a driving member for rotating the drum, a pair of fastening members mounted on the drum for attaching both ends of the master sheet onto the drum, wherein at least one of fastening members is moved from a fastening condition to removing condition by the relative displacement of the drum and the driving member.

2 Claims, 3 Drawing Figures

DEVICE FOR DETACHABLY ATTACHING A MASTER SHEET TO A DRUM

BACKGROUND OF THE INVENTION

The present invention relates to a device for detachably attaching a photosensitive sheet to a drum of a copying machine or for detachably attaching a master sheet such as a flat board onto a printing drum of an offset printing machine.

There has heretofore been provided a device for detachably attaching a master sheet onto the drum by fastening it onto the periphery of the drum using clamping screws, requiring clumsy operation for attaching and detaching the master sheet.

SUMMARY OF THE INVENTION

The object of the present invention is to provide a device for easily attaching and detaching a master sheet onto a drum.

According to a device for detachably attaching a master sheet onto a drum of the present invention, a clutch means is provided between the drum and a drive member for driving the drum so that the drum and the drive member undergo displacement relative to each other, a tensioned state of means for attaching the master sheet onto the drum is loosened by the relative displacement of the drum and the drive member, and the master sheet is allowed to be attached or detached.

DETAILED DESCRIPTION OF THE PREFERRED EMBODIMENT

Figure 1:
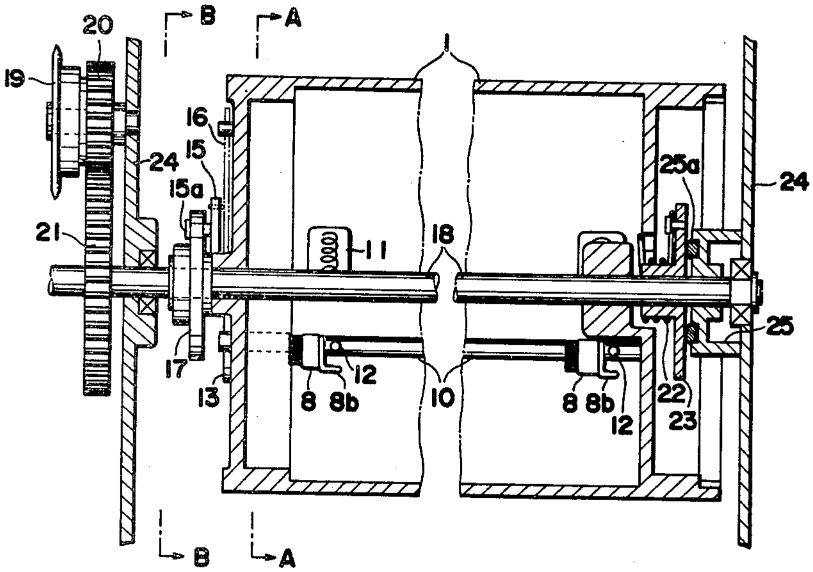
FIG. 1 is a cross-sectional side view illustrating a device for detachably attaching a photosensitive sheet onto a drum of a copying machine as well as a mechanism for rotating the drum.
Figure 2:
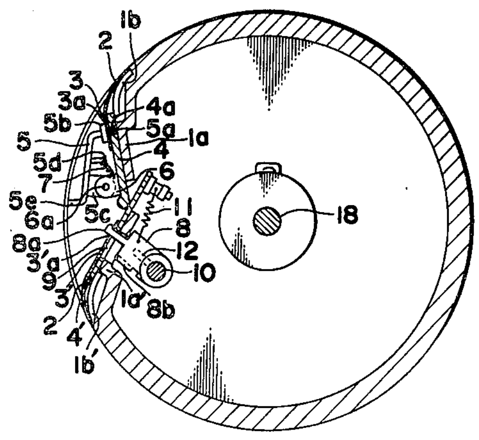
FIGS. 2 and 3 are a diagram which is viewed from a plane of the arrow A—A of FIG. 1, and a diagram which is viewed from a plane of the arrow B—B of FIG. 1.

Referring to the drawings, reference numeral 1 denotes a drum, and 2 denotes a photosensitive sheet which is intimately adhered onto the peripheral surface of the drum 1. The drum 1 has an abutment portion (no reference symbol) in which guide portions 1*b*, 1*b*′ being provided for preventing the photosensitive sheet 2 from rubbing by the corners of foundation portions 1*a*, 1*a*′ on which are mounted means for fastening both edges of the photosensitive sheet 2. The guide portion and the foundation portion are provided at inner side of the periphery surface of the drum. The photosensitive sheet 2 has at its both edges hooking members 3, 3′. Reference numerals 4, 4′ denote fastening plates which are mounted on the foundation portions 1*a*, 1*a*′ of the drum 1. The fastening plate 4 has a hole 4*a* in which will be inserted a pin 5*a* of a fastening lever 5. The fastening plate 4 further has a hinged bracket 6. The fastening lever 5 having pin 5*a* and pressing seat 5*b* at a root portion thereof is rotatably coupled to a shaft pin 6*a* of the hinged bracket at a hinged portion 5*c*, and is urged to rotate in a direction (clockwise direction in FIG. 2) in which the pin 5*a* is inserted in the hole 4*a* formed in the fastening plate 4 being pulled by a spring 7 which is hooked between a spring-hooking arm 5*d* and the fastening plate 4. Reference number 5*e* represents a portion for unlocking the fastening lever 5 operated by hand of user or operator when attachment or removement of the photosensitive paper is required. When the unlocking portion 5*e* is pushed, the fastening lever 5 is caused to rotate counterclockwise against the force of the spring 7, so that the pin 5*a* is removed from the hole 4*a* formed in the fastening plate 4.

To fasten an end of the photosensitive sheet 2 onto the drum 1, the unlocking portion 5*e* of the fastening lever 5 is pushed to remove the pin 5*a* from the hole 4*a* of the fastening plate 4. Then, the hooking member 3 of the photosensitive sheet 2 is inserted along the surface of the fastening plate 4, a hooking hole 3*a* formed in the hooking member 3 is brought into agreement with the hole 4*a* of the fastening plate 4, and the pushing of the unlocking portion 5*e* is discontinued. Accordingly, the pin 5*a* of the fastening lever 5 is inserted in the hole 4*a* of the fastening plate 4 passing through hooking hole 3*a* of the hooking member 3; pressing seat 5*b* of the fastening lever presses the hooking member 3 onto the fastening plate 4.

To remove the photosensitive sheet 2, the unlocking portion 5*e* of the fastening lever 5 is pushed to remove the pin 5*a* from the fastening plate 4 and the hooking member 3. Thereafter, the hooking member is simply withdrawn to remove the photosensitive sheet 2.

On the other hand, the fastening plate 4′ has an elongated hole 9 through which a hooking portion 8*a* of a fastening lever 8 is allowed to slide. The fastening lever 8 having hooking portion 8*a* is rotatably attached to a swinging shaft 10 which is supported by plates located on both sides of the drum 1 and is urged to rotate in the clockwise direction in FIG. 2 being pulled by a tension spring 11 which is hooked between the swinging shaft 10 and the fastening plate 4′. Reference numeral 8*b* represents a folded driven portion formed in the fastening lever 8, and 12 represents an operation pin studded on the swinging shaft 10. As the swinging shaft 10 is rotated in the counterclockwise direction in FIG. 2, the operation pin 12 comes into contact with the folded driven portion 8*b* to turn the fastening lever 8 in the counterclockwise direction against the force of the tension spring 11. A swinging lever 13 is unitarily coupled to an end portion of the swinging shaft 10 which penetrates through the plates on both sides of the drum. The clutch means is provided between a drive member including the shaft 18 which will be described hereinafter and the drum 1 so that the drive member and the drum undergo displacement relative to each other. A tip of the swinging lever 13 is connected to a clutch lever 15 via a connection lever 14 which is swivel-coupled. By moving the lever 15, the swinging shaft 10 can be rotated in the counterclockwise direction or in the clockwise direction. One end of the clutch lever 15 is swivelconnected to the connection lever 14, and the other end is rotatably fitted to a shaft 1*c* which is studded on a side plate of the drum. The clutch lever 15 has a clutch roller or cam followers 15*a* at a middle portion thereof. The clutch roller 15*a* is pressed by a spring 16 onto the peripheral surface of a clutch disc 17 which is unitarily coupled to a rotary shaft 18 that is loosely fitted to the drum 1. As will be appreciated from the description above, clutch means comprises the clutch disc mounted onto the rotary shaft 18 and cam follower 15*a* mounted at the drum side. Moreover, the clutch disc 17 has a clutch groove 17*a* and a cam protrusion 17*b* on the periphery thereof. The clutch groove 17*a* engages with the clutch roller 15*a* and has such a shape that the drum 1 is prevented from being rotated in the clockwise direction in FIG. 3 relative to the clutch disc 17, and that a predetermined resistance is given to the drum 1 when it rotates in the counterclockwise direction relative to the clutch disc. Namely, when the rotary shaft 18 is rotated in the counterclockwise direction, the clutch groove 17*a* of clutch disc 17 which is unitarily fitted to the rotary shaft 18 pushes the clutch roller 15*a* of the clutch lever 15, so that the drum 1 is rotated via clutch lever 15. When the drum 1 is rotated in the counterclockwise direction in FIG. 3 relative to the clutch disc 17, the clutch roller 15*a* of the clutch lever 15 rides on the cam protrusion 17*b*. The clutch lever 15 therefore is fully rotated in the clockwise direction, whereby the swinging shaft 10 is fully rotated in the counterclockwise direction via connection lever 14 and swinging lever 13, the folded driven portion 8*b* of the fastening lever 8 is pushed by the operation pin 12, and the fastening lever 8 is fully rotated in the counterclockwise direction.

With the fastening lever 8 being fully rotated in the counterclockwise direction, the hooking hole 3*a'* formed in the hooking member 3' at the other edge of the photosensitive sheet 2 is hooked to the hooking portion 8*a* of the fastening lever. When the drum 1 is further rotated in the counterclockwise direction, the clutch roller 15*a* of the clutch lever rolls down the cam protrusion 17*b* of clutch disc and engages again with the clutch groove 17*a*. The clutch lever 15 therefore is rotated in the clockwise direction. Consequently, the fastening lever 8 is rotated in the clockwise direction being pulled by the tension spring 11. The hooking member 3' of the photosensitive sheet 2 is pulled being intimately contacted to the fastening plate 4', and the photosensitive sheet 2 is fitted to the periphery of the drum 1 under intimately adhered and stretched conditions.

To remove the photosensitive sheet 2, the unlocking portion 5*e* of the fastening lever 5 should be pushed to unlock the hooking member 3, and then the hooking member 3' should be detached from the hooking portion 8*a* of the fastening lever 8 as mentioned earlier. Otherwise, the drum 1 may be rotated in the counterclockwise direction relative to the clutch disc 17 to unlock the fastening lever 8, thereby to remove the hooking member 3' from the hooking portion 8*a* first and then to remove the hooking member 3.

Reference numeral 19 denotes a chain wheel driven by a motor (not shown), 20 denotes an intermdiate gear which is coupled to the chain wheel 19 as a unitary structure, and 21 denotes a gear which is coupled to the rotary shaft 18 as a unitary structure. In the above embodiment, furthermore, a braking disc 23 is coupled via a torsion spring 22 to the drum 1 so that the drum 1 rotates smoothly from the start of the operation to the end of the operation. The braking disc 23 has been pressed onto a friction disc 25 which is coupled to a frame 24 being urged by the torsion spring 22. Reference numeral 25*a* represents a friction element made of asbestos or the like which is attached to the friction disc 25.

Figure 3:
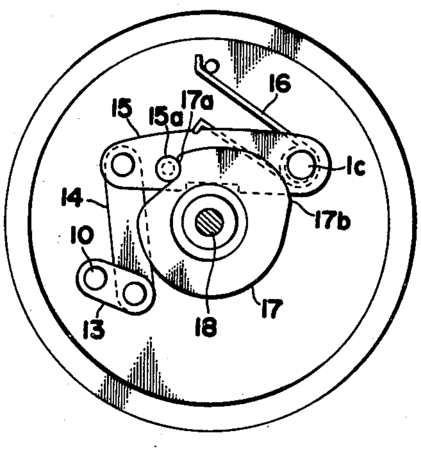

In the above embodiment, the rotary shaft 18 should stop at a predetermined position, i.e., the clutch disc 17 should stop at a predetermined position, so that when the fastening lever 8 is unlocked by rotating the drum 1 in the clockwise direction in FIG. 3 relative to the clutch disc 17, the drum 1 is allowed to stop at a predetermined position. By so selecting the stop position that the photosensitive sheet can be conveniently attached or detached, it is made possible to further easily carry out the operation of replacing the photosensitive sheet.

As mentioned earlier, the present invention is by no means limited to the application of copying machines, but can be utilized for the devices for detachably attaching the sheet to the rotary drum such as of offset printing machines.

What is claimed is:

1. In a copying machine having a drum of the type in which a master sheet is detachably attached to the periphery of the drum, the machine which comprising; a rotary shaft connected to a drive member for supporting the drum; clutch means being provided between the drum and the drive member for rotating the drum so that the drum and the drive member undergo displacement relative to each other; a pair of fastening members mounted on the drum, movably, for attaching both ends of the master sheet onto the drum; wherein at least one of fastening members is moved from a fastening condition to removing condition by the relative displacement of the drum and the drive member.

2. A device for detachably attaching a master sheet onto a drum according to claim 1, wherein the clutch means comprises a cam secured to the drive member and a cam follower mounted on the drum.

* * * * *